United States Patent [19]
Dynan et al.

[11] Patent Number: 5,972,818
[45] Date of Patent: Oct. 26, 1999

[54] RAW BATCH FOR MAKING CRACK-FREE SILICON CARBIDE DIFFUSION COMPONENTS

[75] Inventors: Stephen Dynan, Sterling; Jack Shindle, Rutland; John Vayda, West Brookfield, all of Mass.

[73] Assignee: Saint-Gobain/Norton Industrial Ceramics Corporation, Worcester, Mass.

[21] Appl. No.: 09/277,832

[22] Filed: Mar. 26, 1999

Related U.S. Application Data

[62] Division of application No. 08/926,640, Sep. 10, 1997, Pat. No. 5,902,760, which is a division of application No. 08/725,717, Oct. 4, 1996, Pat. No. 5,702,997.

[51] Int. Cl.$^6$ .................................................. C04B 35/569
[52] U.S. Cl. ................................................. 501/88; 501/90
[58] Field of Search ........................................ 501/88, 90

[56] References Cited

U.S. PATENT DOCUMENTS

| | | |
|---|---|---|
| 4,238,434 | 12/1980 | Enomoto . |
| 4,342,837 | 8/1982 | Suzuki . |
| 4,487,734 | 12/1984 | Sawamura . |
| 4,693,988 | 9/1987 | Boecker . |
| 4,701,426 | 10/1987 | Okuno . |
| 4,753,763 | 6/1988 | Tanaka . |
| 4,771,021 | 9/1988 | Tamamizu . |
| 4,836,965 | 6/1989 | Hayashi . |
| 4,859,385 | 8/1989 | Tanaka . |
| 4,957,811 | 9/1990 | Benker . |
| 4,980,104 | 12/1990 | Kawasaki . |
| 4,987,103 | 1/1991 | Kinugasa . |
| 4,994,417 | 2/1991 | Yamada . |
| 4,998,879 | 3/1991 | Foster . |
| 5,001,088 | 3/1991 | Hauptmann . |
| 5,094,985 | 3/1992 | Kijima et al. . |
| 5,179,049 | 1/1993 | Numata . |
| 5,422,322 | 6/1995 | Chen . |
| 5,486,496 | 1/1996 | Talbert . |
| 5,702,997 | 12/1997 | Dynan et al. ............................ 501/88 |
| 5,902,760 | 5/1999 | Dynan et al. ............................ 501/88 |

FOREIGN PATENT DOCUMENTS

| | | |
|---|---|---|
| 0 308 695 A2 | 3/1988 | European Pat. Off. . |
| 0 340 802 A2 | 11/1989 | European Pat. Off. . |

OTHER PUBLICATIONS

Jacobson et al., J. Am. Cer. Soc. 75 (6) 1603–11 (1992).
Ness et al. J.Am. Cer. Soc. 77 (111) 2879–84 (1994).

*Primary Examiner*—Karl Group
*Attorney, Agent, or Firm*—Thomas M. DiMauro

[57] ABSTRACT

A raw batch for producing a crack-free recrystallized silicon carbide body, the raw batch comprising:

i) at least 40 w/o fine grain fraction having a particle size of less than 10 microns, the fine grain fraction comprising silicon carbide and fine free carbon, wherein the fine free carbon is present in an amount of at least 0.10 w/o of the raw batch, the fine free carbon having a surface area of at least 10 m$^2$/g, ii) at least 40 w/o coarse grain fraction having a particle size of at least 30 microns, the coarse grain fraction comprising silicon carbide and coarse free carbon, wherein the coarse free carbon is present in an amount of at least 0.10 w/o of the coarse grain fraction, the raw batch having a total silica content of at least 0.5 w/o, the raw batch having a total silicon carbide content of at least 96 w/o.

16 Claims, No Drawings

RAW BATCH FOR MAKING CRACK-FREE SILICON CARBIDE DIFFUSION COMPONENTS

This is a divisional application of application U.S. Ser. No. 08/926,640, filed Sep. 10, 1997, now U.S. Pat. No. 5,902,760 which is a divisional application of U.S. Ser. No. 08/725,717, filed Oct. 4, 1996, (now U.S. Pat. No. 5,702, 997).

BACKGROUND OF THE INVENTION

The manufacture of semi-conductor devices such as diodes and transistors typically requires the deposition of dielectric materials such as polycrystalline silicon, silicon nitride and silicon dioxide on the surfaces of thin silicon wafers. The thin layer deposition of these materials involves rapid heating and cooling cycles in an electrically heated furnace (or "diffusion process tube") at temperatures typically ranging from 250 to 1000 C. When dielectric precursor gases are fed into a diffusion process tube heated to these temperatures, the gases react and deposit the dielectric reaction product on the surface of the silicon wafer.

During the deposition step, the silicon wafers are supported in vertical or horizontal kiln furniture (or "wafer boats") placed within the process tube. The wafer boat and process tube are typically made of a material which has excellent thermal shock resistance, high mechanical strength, an ability to retain its shape through a large number of heating and cooling cycles, and which does not out-gas (i.e., introduce any undesirable impurities into the atmosphere of the kiln during firing operations). One material which meets these requirements is silicon carbide.

When the diffusion component is used in high temperature applications, metallic impurities contained therein often diffuse through the body and contaminate the silicon wafer. Accordingly, as a general rule, it is desirable to use as pure a diffusion component as possible, and so raw silicon carbide powders are generally purified to reduce the contaminant levels therein. However, in many relatively low temperature applications wherein the danger of metallic diffusion and contamination is not so great, a less pure diffusion component can be used. In one method of making these diffusion components, a slurry comprising a bimodal blend of untreated silicon carbide powders is slip cast to form a green body, and the green body is fired above about 1900 C. to promote recrystallization. Although use of low purity powders in this process dramatically lowers the cost of making silicon carbide diffusion components for these applications, it has been found that many components so made crack during recrystallization. Since these cracks render the component essentially useless, the cost of supplying less pure diffusion components increases.

SUMMARY OF THE INVENTION

In accordance with the present invention, there is provided a method for producing a crack-free sintered silicon carbide body, comprising the steps of:
a) providing a raw powder batch comprising:
  i) at least 40 weight percent ("w/o") fine grain fraction having a particle size of less than 10 microns, the fine grain fraction comprising silicon carbide and at least 0.10 w/o free carbon, the free carbon having a surface area of at least 10 m²/g;
  ii) at least 40 w/o coarse grain fraction having a particle size of at least 30 microns, the coarse grain fraction comprising silicon carbide and at least 0.1 w/o free carbon,
the raw batch having a total silicon carbide content of at least 96 w/o,
the raw batch having a total silica content of at least 0.5 w/o,
b) forming the raw batch into a green body (preferably by slip casting), and
c) recrystallizing the green body to provide a recrystallized silicon carbide body having a density of between 2.0 g/cc and 2.8 g/cc (preferably between 2.60 g/cc and 2.75 g/cc).

Also in accordance with the present invention, there is provided a method for producing a crack-free sintered silicon carbide body, comprising the steps of:
a) providing a raw powder batch comprising:
  i) at least 40 weight percent ("w/o") fine grain fraction having a particle size of less than 10 microns, the fine grain fraction comprising silicon carbide,
  ii) at least 40 w/o coarse grain fraction having a particle size of at least 30 microns, the coarse grain fraction comprising silicon carbide and less than 0.10 w/o free carbon,
the raw batch having a total silicon carbide content of at least 96 w/o,
the raw batch having a total silica content of at least 0.5 w/o,
b) forming the raw batch into a green body (preferably by slip casting), and
c) recrystallizing the green body to provide a recrystallized silicon carbide body having a density of between 2.0 g/cc and 2.8 g/cc (preferably between 2.6 and 2.75 g/cc).

Also in accordance with the present invention, there is provided a method for producing a crack-free sintered silicon carbide body, comprising the steps of:
a) providing a raw powder batch comprising:
  i) at least 40 w/o fine grain fraction having a particle size of less than 10 microns, the fine grain fraction comprising silicon carbide and from 0.10 w/o to less than 0.5 w/o silica, and
  ii) at least 40 w/o coarse grain fraction having a particle size of at least 30 microns, the coarse grain fraction comprising silicon carbide, at least 0.1 w/o free carbon, and at least 0.10 w/o silica,
the raw batch having a total silicon carbide content of at least 96 w/o,
the raw batch having a total silica content of less than 0.5 w/o,
b) forming the raw batch into a green body (preferably by slip casting), and
c) recrystallizing the green body to provide a recrystallized silicon carbide body having a density of between 2.0 g/cc and 2.8 g/cc (preferably between 2.60 and 2.75 g/cc).

DETAILED DESCRIPTION OF THE INVENTION

Three approaches of solving the problem of cracking during recrystallization in bimodal silicon carbide blends have been found. In the first method, fine carbon is added to the raw batch. In the second method, the amount of coarse free carbon is controlled. In the third, the silica content of the raw batch is controlled by essentially controlling the silica content of the fines.

It is believed that carbon-containing inclusions which are typically present in coarse silicon carbide feed play a significant role in the cracking phenomenon. Conventional coarse silicon carbide feed contains 0.1 w/o to 0.5 w/o free carbon as impurity. During firing, the silica present on the surfaces of both the fine and coarse SiC fractions undergoes a carbothermal reduction in the temperature range of about 1450 C. to 1650 C. to form SiO gas. The SiO gas then reacts with the coarse carbon-containing inclusions and at least partially converts the inclusions to silicon carbide while forming CO as a by-product. Since the molar volume of SiC is larger than that of carbon, the conversion from C to SiC also produces a large solid volume expansion which can cause stresses. These stresses may be relieved by cracking.

Moreover, examination of the cracked recrystallized bodies produced by conventional slip cast processing of bimodal silicon carbide powders revealed cracks generally running parallel to the casting direction. Without wishing to be tied to a theory, it is believed the large breadth of the bimodal silicon carbide particle size distribution leads to significant particle segregation during casting. This segregation leads to localized low density regions of coarse particles which pack relatively poorly in the green body and bond together only weakly during recrystallization. Therefore, it is believed the cracks caused by the carbon inclusion reaction with SiO gas run through these weakly bonded planes.

Accordingly, the three solutions outlined above can be explained as follows. In the first approach, wherein fine carbon is added to the raw batch, the high surface area of the added carbon causes it to preferentially react with the SiO gas, thus preventing reaction between the large carbon-containing inclusions and the SiO gas and the associated harmful volume expansion of C to SiC. The criticality of adding at least 0.10 w/o fine carbon to the conventional raw batch to achieve this effect is best shown in Examples 10, 14 and 15 below. The advantage of practicing this embodiment is that it allows the use of raw silicon carbide powders which do not need to be treated to remove silica or free carbon.

The fine carbon of the fist embodiment preferably has a surface area of between 10 $m^2/g$ and 200 $m^2/g$ (preferably between 50 $m^2/g$ and 200 $m^2/g$), and is typically added in an amount of about 0.10 w/o to about 5 w/o of the raw batch, preferably between 0.1 w/o and 0.75 w/o.

It was also found that the fine carbon additions of the first approach produces a smaller pore size distribution in the recrystallized body (i.e., the median pore size, as measured by mercury porosimetry, decreased from about 4 microns to less than 1 micron). The smaller pore sizes are believed to be due to effective deoxidization of the silica on the surface of the silicon carbide grains by the fine carbon, thereby lessening the driving force towards grain coarsening.

In the second approach, wherein coarse carbon-containing inclusions in the raw batch are controlled, the frequency of these inclusions, and hence the regions stressed by the volume expansion of C to SiC is reduced. The criticality of limiting the coarse free carbon content to less than 0.1 w/o of the coarse fraction to achieve this effect is best shown in Examples 8,11,12,15 and 16 below. The advantage of practicing this embodiment is that it can be practiced by simply calcining a conventional coarse silicon carbide powder (which typically has 0.1 to 0.25 w/o free carbon) in order to lower its free carbon level to below 0.1 w/o.

Preferably, the coarse fraction of the second embodiment comprises no more than 0.06 w/o free carbon, more preferably no more than 0.02 w/o, more preferably less than 0.01 w/o. Coarse silicon carbide powders having higher amounts of free carbon can be subjected to conventional calcination in order to suitably lower their level of free carbon to less than 0.1 w/o.

The finding that limiting coarse carbon-containing inclusions can prevent cracking is somewhat suprising in that the conventional art has generally considered carbon additions to be beneficial in making silicon carbide bodies. For example, U.S. Pat. No. 4,771,021 discloses the addition of fine carbon particles in making of a siliconized silicon carbide component U.S. Pat. No. 4,957,811 discloses the use of 0.1–500 micron carbon particles in making a siliconized silicon carbide body. U.S. Pat. No. 4,536,449 describes a siliconized silicon carbide composite made by incorporating graphite particles on the order of 75 to 300 microns. U.S. Pat. No. 5,486,496 describe a sintered silicon carbide body having graphite inclusions of at least 100 microns. Jacobson, J. Am. Cer. Soc. 75 [6] 1603–11 (1992) studied the reaction of silicon carbide and silicon oxide in the presence of free carbon grains up to 50 microns in size, and concluded that the additional free carbon must be added in the early stages of the sintering reaction in order to form additional CO and SiC.

In the third approach, wherein the silica content of the green body is controlled, the critical silica reactant which initiates the above reactions is substantially reduced. The criticality of maintaining the silica content below 0.5 w/o of the total raw batch is best shown in Examples 1,2 and 5. The advantage of this embodiment is that it typically requires acidic or basic treatment of only the fine fraction in order to lower the total silica content of the raw batch beneath the 0.5 w/o critical level.

Typical untreated fine silicon carbide feed has about 1.6 w/o to 2.0 w/o silica, whereas typical untreated coarse silicon carbide feed has only about 0.4 w/o silica. Similarly, typical treated fine silicon carbide feed has less than 0.5 w/o silica (typically about 0.4 w/o), while typical treated coarse silicon carbide feed has about 0.01 w/o silica. The reason for the higher silica level in the fine fraction is that silica is present on silicon carbide grain as a surface phenomenon, and fine grains have a higher specific surface area than coarse grains. When substantially equal amounts of untreated fine and untreated coarse SiC grains are used (which produces a raw batch having about 1.0–1.2 w/o silica), about 80–85% of the silica resides in the fine fraction. Treating solely the fine fraction effectively reduces the silica content thereof to about 0.4 w/o, so that the overall silica content of a raw batch comprising treated fine and untreated coarse silicon carbide feed is about 0.4 w/o.

The raw batch used in the present invention typically comprises between 40 and 60 w/o (preferably, between 45 w/o and 55 w/o) fine grains having a grain size of less than 10 microns. Preferably, at least 80 w/o of the fine fraction has a particle size of between 0.4 and 8 um. More preferably, the median particle size is between 1 and 4 um, most preferably between 2 and 3 um.

The raw batch also typically comprises between 40 and 60 w/o (preferably, between 45 w/o and 55 w/o) coarse grains having a particle size of more than 30 microns. Preferably, at least 80 w/o of the coarse fraction has a particle size of between 65 um and 150 um.

Preferably, the raw batch of the present invention consists essentially of silicon carbide grains with impurity levels of free carbon and silica. In some embodiments, at least 96 w/o (and preferably at least 98 w/o) of the fine fraction is silicon carbide. In the first two embodiments, between about 1.0 w/o and 3 w/o (and more typically between 1.5 w/o and 2.5 w/o) of the fine fraction is typically silica. In the third embodiment, between about 0.10 w/o and 0.4 w/o of the fine fraction is typically silica. Similarly, at least 96 w/o (preferably at least 98 w/o) of the coarse fraction is silicon carbide. In the first two embodiments, between about 0.01 w/o and 0.3 w/o of the coarse fraction is typically silica. In the third embodiment, from about 0.10 w/o to less than 0.5 w/o of the coarse fraction is typically silica.

Preferably, the raw batch is mixed by a liquid carrier to make a slip. The liquid carrier is preferably deionized water, and generally comprises about 12 to 16 w/o of the solids. Conventional defloculation additives may also be used in appropriate amounts.

Preferably, the slip is dewatered by pouring the slip into a plaster of paris mold and allowing the slip to cast against the face of the mold. The resulting green body typically has a bulk density of between about 2.60 g/cc and 2.75 g/cc and a four point bending strength of at least 500 psi. Its pore sizes range from 0.1 to 0.5 microns, with a median pore size of about 0.2 um.

Preferably, the green body is recrystallized in a cycle including a 1 hour soak at about 1700 C. to 2000 C. under an argon atmosphere of about 600 millitorr. Preferably, the soak is undertaken in the 1800 C. to 2000 C. temperature range, more preferably in the 1900 C. to 2000 C. temperature range. Typical dry shrinkage is between about 0.02% and 0.1% (more typically between 0.04 and 0.07%), thereby yielding a fired SiC body having a density of between 2.0 g/cc and 2.8 g/cc, typically 2.6 g/cc and 2.75 g/cc when slip casting is used. The resulting uncracked recrystallized body has a room temperature 4 point flexural strength of at least 100 MPa (typically between 140 MPa and 170 MPa), and a 1350 C. four-point flexural strength in argon of at least 100 MPa (typically between 120 MPa and 170 MPa). Its average pore size is typically between 0.5 and 6 um.

EXAMPLES

For each of the examples set out below, unless otherwise specified, the following standard procedure was followed. A silicon carbide mixture comprising 52 w/o fine silicon carbide having a mean particle size of between 2 and 3 microns, and 48 w/o coarse silicon carbide having a particle size of between 30 and 150 microns was used. The fine silicon carbide had a silica content of 1.2 to 2.0 w/o and a free carbon content about 0.3 w/o to 0.5 w/o, while the coarse silicon carbide had a silica content of about 0.3–0.5 w/o and a free carbon content ranging from 0.13 to 0.24 w/o. This mixture was mixed with about 12 w/o to 16 w/o water, about 0.25 to 1.0 w/o acrylic binder, and an appropriate amount of deflocculating agent to form a slip. The slip was then poured into a plaster of paris mold and dewatered to produce a green body having the shape of a part of a diffusion component.

The green body was fired in a sintering cycle which included a 3 C./minute ramp to about 1940 C. for 1 hour in an argon atmosphere having a 600 millitorr vacuum.

Example 1

This Example evaluated the effect of using raw powders having different silica contents and different particle sizes. One sintered body was made in substantial accordance with the standard procedure and sintered cracking was displayed. When the standard fine fraction was replaced with a more pure fine fraction having a silica content of only 0.4 w/o (thereby reducing the total silica content from about 1 w/o to about 0.4 w/o), cracking was eliminated. In another trial, the standard coarse grain was replaced with a more pure coarse fraction having a silica content of only 0.01 w/o (thereby reducing the total silica content from about 1 w/o to about 0.8 w/o), but cracking was not eliminated. In another trial, each standard fraction was replaced with the more pure (i.e., less silica) corresponding fraction (thereby reducing the total silica content from about 1 w/o to about 0.2 w/o) and cracking was eliminated. The results of these studies indicate the silica content of the green body (which appears mainly in the fine fraction) contributes to the cracking problem.

Concurrently, a sintered body was made in substantial accordance with the standard procedure, except that the fine fraction constituted 100% of the silicon carbide. The resulting bodies displayed no cracking. This result indicates the bimodal nature of the particle size distribution of the raw batch contributes to the cracking phenomenon.

Example 2

This Example studied the effect of intentionally doping the raw batch with silica. Sintered bodies were made in substantial accordance with the standard procedure, except that both the fine and coarse fractions were replaced with the high purity fractions set out in Example 1, and the high purity fine fraction was then calcined in order to raise its silica content from about 0.4 w/o to about 1.2 w/o (thereby raising the total silica content of the green body from about 0.2 w/o to about 0.6 w/o). The resulting sintered bodies displayed significant cracking. These results show that a total silica content of above 0.6 w/o in the raw batch leads to increased cracking in the fired body. Together with the results of Example 1, a critical level of about 0.5 w/o total silica is revealed.

Example 3

This example studied the effect of narrowing the breath of the bimodal particle size distribution of the silicon carbide powder. Sintered bodies were made in substantial accordance with the standard procedure, except that the coarse fraction was gradually replaced with an F240 fraction characterized by a free carbon content of 0.06 w/o and a median particle size of about 40 um. The resulting sintered bodies showed decreased cracking frequency with increasing substitution, with no cracks appearing when the coarse fraction had at least 70% of the substituted F240 powder. However, when this F240 fraction was replaced with another F240 fraction having a free carbon content of about 0.08 w/o, the fired bodies displayed cracking. These results show that simply narrowing the particle size distribution of the bimodal mix does not solve the cracking problem. They also suggest that reducing the free carbon level in the standard coarse grain (which is about 0.12–0.24 w/o of the coarse fraction) by about 70% provides a critical level of free carbon (about 0.04 to about 0.07 w/o) below which cracking is essentially prevented.

Example 4

This Example studied the effect of reducing the median particle size of the coarse grain fraction. Sintered bodies were made in substantial accordance with the standard procedure, except that the coarse fraction was screened to remove larger particles and this reduced the median particle size by about 10%. However, the resulting sintered bodies showed cracking. This result again indicates the insufficiency of altering the particle size distribution of the coarse fraction to reduce cracking.

Example 5

This example also studied the effect of intentionally doping the raw batch with silica, as in Example 2. Sintered bodies were made in substantial accordance with the standard procedure, except that both the fine and coarse fractions were replaced with the high purity fractions set out in Example 1, and 1 w/o, 3 w/o and 5 w/o fine silica was added to the raw batch in order to raise its total silica content from about 0.2 w/o to about 1.2 w/o, 3.2 w/o and 5.2 w/o, respectively. The resulting sintered bodies displayed significant cracking. These results show that increasing the total silica content in the raw batch from 0.2 w/o to at least 1.2 w/o leads to increased cracking in the sintered body.

In separate studies, fine silica was added to a raw batch containing 100% fine SiC powder. Cracking was not observed. This finding further indicates the bimodal nature of the particle size distribution plays a key role in the cracking phenomenon.

Example 6

This Example studied the effect of increasing the percentage of the fine silicon carbide fraction in the raw batch. Sintered bodies were made in substantial accordance with the standard procedure, except that the fine fraction was increased from 52 w/o to up to 58 w/o. The resulting sintered bodies showed about as much cracking as bodies produced in accordance with the standard procedure. These results show that significant increases in the fines content does not alleviate the particle segregation phenomenon to the extent needed to prevent fired cracking.

Example 7

Modified sintering cycles were evaluated as a means of controlling the vaporization kinetics associated with the carbothermal reduction of silica. In particular, intermediate hold segments, reduced ramp rates, and changes to the argon atmosphere were evaluated. These modifications demonstrated no effect on controlling the severity of cracking.

Example 8

Physical and chemical characterization of selected coarse fractions known to produce sintered cracking was undertaken, and the results were compared with similar characterizations of other coarse fractions known to have produced uncracked components. The characterization included particle shape analysis, purity analysis, phase composition analysis and thermal activation analysis. The results of this comparison revealed that the only difference between these two groups of coarse fractions was in their free carbon levels. In particular, the coarse fractions associated with cracking showed a higher free carbon level than those associated with no cracking.

Example 9

This Example studied the effects of lowering the average particle size in the fine fraction. Since it is known that improved green strength could be expected to improve the green body's crack resistance during firing, the green strength of the green body was enhanced by replacing the standard fine grain (which has an average particle size of about 2-3 microns) with an even finer grain (which had a submicron particle size. The bodies having the finer particle size did not exhibit an decreased frequency of cracking.

Example 10

This example studied the effects of fine carbon additions. Fine carbon having a size range of between 10 $m^2/g$ and 200 $m^2/g$ was added in amounts of about 0.1 w/o to about 0.75 w/o of the raw batch of standard fine and coarse grams. The resulting sintered bodies in each case were totally devoid of cracks.

Example 11

This Example examined controlling the free carbon level in both the fine and coarse grain fractions. To this end, coarse grains having a free carbon content of about 0.24 w/o were made into a bed having a 3 inch (8 cm) bed and were calcined at 600 C. for two hours in air. Fine grains having a free carbon content of about 0.3 w/o were similarly calcined. The coarse calcined grains were found to have a free carbon content of only about 0.06 w/o, and the fine calcined grains had a free carbon content of less than 0.05 w/o. Firing the fine calcined grains with standard coarse grains did not show any improvement in cracking. However, when the calcined coarse grains were used with standard fine grains, the resulting sintered bodies were free of cracks. The substantial absence of coarse carbon-containing inclusions is believed to be the principal reason for the desirable results obtained by the raw batch having the calcined coarse fraction Example 12

Components were sintered with various combinations of two commercially available fine silicon carbide powders A and B, and two commercially available coarse silicon carbide powders C and D. The results revealed that each combination using coarse powder D showed cracking, while each combination using coarse powder C showed no cracking. Physical and chemical characterization of two coarse fractions C and D was undertaken, including particle shape analysis, purity analysis, phase composition analysis, and thermal activation analysis. The results of this characterization showed the only difference to be the free carbon level. In particular, the coarse powder D (which produced cracking) showed a higher free carbon level (about 0.20 w/o) than coarse powder C (which produced no cracking and had a free carbon level of about 0.02 w/o). This finding is consistent with that shown in Example 8.

Example 13

This Example studies the effects of sedimentation upon free carbon. Coarse fractions known to produce cracking were subjected to sedimentation, wherein the powder is floated on water, and the density difference between the carbon and silicon carbide particles is used to separate the carbon from the silicon carbide. However, it was found that the powders resulting from the sedimentation did not lower the cracking frequency.

Example 14

This example studied the effects of the type of fine carbon added to the raw batch. In particular, both carbon black and colloidal carbon were added to raw batches in a manner substantially similar to that of Example 10. The results indicated that colloidal carbon additions began to eliminate cracking at additive levels of only 0.2 w/o, while carbon black began to eliminate cracking levels at 0.5 w/o. Thus, colloidal carbon was much more effective in eliminating cracks than was carbon black.

Example 15

This Example evaluated the fired microstructure at various stages of the sintering cycle. Since previous dilatometer studies indicated a drastic volume increase occurs the range of 1450 C. to 1600 C., the microstructures of components fired up to 1400 C. and to 1600 C. was studied. The components fired up to 1400 C. did not display cracking, but the microstructures of the components using coarse fractions known to produce cracking were found to contain large (150 micron) carbon-containing inclusions. These inclusions generally contained about 20% to about 40% silicon, with the remainder being carbon. When batches having large carbon-containing inclusions in the coarse fraction were fired to 1650 C., the green bodies which had fine carbon addition did not crack and the carbon-containing inclusions therein were not converted to SiC, while the components which had no fine carbon addition were cracked and the carbon-containing inclusions therein were converted to SiC. Moreover, the cracks in the components having converted inclusions appeared to originate precisely at the converted inclusions. These inclusions were found to contain about 40% to about 50% silicon, with the remainder being carbon. These results show that the solid volume expansion caused by conversion of the carbon-containing inclusions to SiC causes a critical stress in the green body which leads to cracking.

Example 16

This example studied green bodies intentionally doped with large carbon containing inclusions. High purity graphite was ground to 150 um size using a silicon carbide mortar and pestle. Inclusions in the amount of 0.01 w/o to 0.2 w/o were added to raw batches comprising coarse fractions known to produce uncracked sintered components without fine carbon addition. In one case wherein the selected coarse fraction (which had a free carbon content of about 0.14 w/o) was known to produce relatively little cracking, the dopant enhanced the degree of cracking with increased dopant concentration. In another case wherein the selected coarse fraction (which had a free carbon content of about 0.06 w/o) was known to produce no cracking, the doped batches produced cracking which increased in severity with increased dopant concentration. Evaluation of the microstructures showed that cracks originated from converted inclusions. These results clearly show the role of carbon-containing inclusions in fired cracking.

We claim:

1. A raw batch for producing a crack-free recrystallized silicon carbide body, the raw batch comprising:

i) at least 40 w/o fine grain fraction having a particle size of less than 10 microns, the fine grain fraction comprising silicon carbide and fine free carbon, wherein the fine free carbon is present in an amount of at least 0.10 w/o of the raw batch, the fine free carbon having a surface area of at least 10 $m^2/g$, ii) at least 40 w/o coarse grain fraction having a particle size of at least 30 microns, the coarse grain fraction comprising silicon carbide and coarse free carbon, wherein the coarse free carbon is present in an amount of at least 0.10 w/o of the coarse grain fraction, the raw batch having a total silica content of at least 0.5 w/o, the raw batch having a total silicon carbide content of at least 96 w/o.

2. The raw batch of claim 1 wherein the fine free carbon has a surface area of between 10 $m^2/g$ and 200 $m^2/g$.

3. The raw batch of claim 1 wherein the fine free carbon has a surface area of between 50 $m^2/g$ and 200 $m^2/g$.

4. The raw batch of claim 1 wherein the fine free carbon comprises between 0.1 w/o and 5 w/o of the raw batch.

5. The raw batch of claim 1 wherein the fine free carbon comprises between 0.1 w/o and 0.75 w/o of the raw batch.

6. The raw batch of claim 1 wherein the recrystallized body has a porosity characterized by a median pore size of less than 1 micron.

7. The raw batch of claim 1 wherein the raw batch comprises between 45 w/o and 55 w/o fine fraction.

8. The raw batch of claim 7 wherein at least 80 w/o of the fine grain fraction has a particle size of between 0.4 and 8 um.

9. The raw batch of claim 8 wherein the average particle size of the fine grain fraction is between 1 and 4 um.

10. The raw batch of claim 1 wherein the raw batch comprises between 45 w/o and 55 w/o coarse fraction.

11. The raw batch of claim 10 wherein at least 80 w/o of the coarse grain fraction has a particle size of between 65 and 150 um.

12. The raw batch of claim 1 wherein at least 96 w/o of the fine grain fraction is silicon carbide.

13. The raw batch of claim 12 wherein between about 1.0 w/o and 3 w/o of the fine grain fraction is silica.

14. The raw batch of claim 13 wherein between 1.5 w/o and 2.5 w/o of the fine grain fraction is silica.

15. The raw batch of claim 1 wherein at least 96 w/o of the coarse grain fraction is silicon carbide.

16. The raw batch of claim 15 wherein between about 0.01 w/o and 0.3 w/o of the coarse grain fraction is silica.

* * * * *